(12) United States Patent
Morimoto et al.

(10) Patent No.: US 7,317,500 B2
(45) Date of Patent: Jan. 8, 2008

(54) LIQUID CRYSTAL DISPLAY DEVICE PROVIDED WITH A REFLECTIVE-TYPE MONOCHROMATIC DISPLAY SCREEN IN ADDITION TO A COLOR DISPLAY SCREEN

(75) Inventors: Hirokazu Morimoto, Fukaya (JP); Keiji Tago, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 179 days.

(21) Appl. No.: 11/175,357

(22) Filed: Jul. 7, 2005

(65) Prior Publication Data

US 2006/0017866 A1    Jan. 26, 2006

(30) Foreign Application Priority Data

Jul. 22, 2004  (JP) ............................. 2004-214162
May 12, 2005  (JP) ............................. 2005-140418

(51) Int. Cl.
*G02F 1/1335* (2006.01)
(52) U.S. Cl. .................... 349/106; 349/113; 349/114
(58) Field of Classification Search ............. 349/106, 349/113–114
See application file for complete search history.

(56) References Cited

U.S. PATENT DOCUMENTS 6,542,209 B2 * 4/2003 Kim et al. ................ 349/106
6,697,138 B2 * 2/2004 Ha et al. .................. 349/114
6,714,270 B2   3/2004 Seiki et al.
2002/0097356 A1 * 7/2002 Kawase et al. ........... 349/106
2006/0017866 A1   1/2006 Morimoto et al.

FOREIGN PATENT DOCUMENTS

JP        2002-303863       10/2002

OTHER PUBLICATIONS

U.S. Appl. No. 11/555,880, filed Nov. 2, 2006, Tago et al.

* cited by examiner

*Primary Examiner*—Andrew Schechter
*Assistant Examiner*—Lauren Nguyen
(74) *Attorney, Agent, or Firm*—Oblon, Spivak, McClelland, Maier & Neustadt, P.C.

(57) ABSTRACT

In a liquid crystal display device including not only a color display screen but also a monochrome display screen, blue color layers are partially formed in each area corresponding to each reflective electrode in an auxiliary screen for monochrome display in order to suppress yellowing of the monochrome display screen caused by wavelength dispersion characteristics of liquid crystal. The blue color layers are formed, for example, in a random pattern such as a dot pattern.

2 Claims, 11 Drawing Sheets

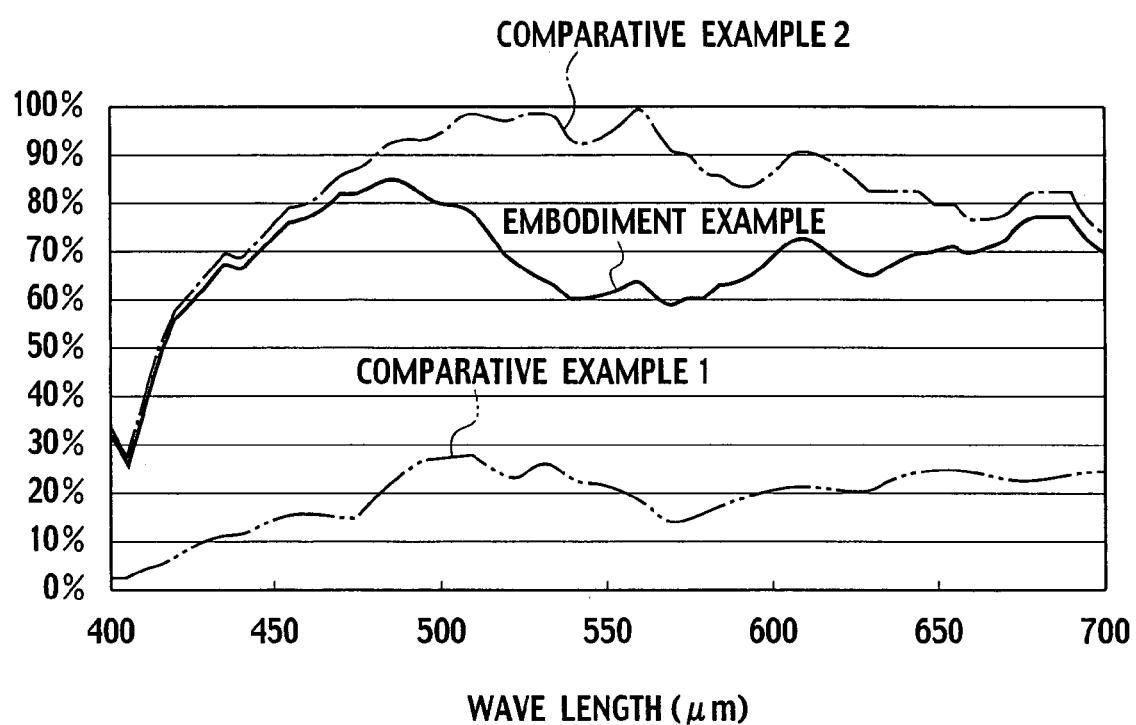

LIQUID CRYSTAL DISPLAY DEVICE PROVIDED WITH A REFLECTIVE-TYPE MONOCHROMATIC DISPLAY SCREEN IN ADDITION TO A COLOR DISPLAY SCREEN

CROSS REFERENCE TO RELATED APPLICATIONS

This application is based upon and claims the benefit of priority from Japanese Patent Applications No. 2004-214162 filed on Jul. 22, 2005 and No. 2005-140418 filed on May. 12, 2005; the entire contents of which are incorporated herein by reference.

BACKGROUND OF THE INVENTION

1. Field of the Invention

The present invention relates to a liquid crystal display device provided with not only a full-color display screen but also a monochrome display screen.

2. Description of the Related Art

Recently, in the area of mobile information terminals such as mobile phones and smart phones, light-weight, thin, and low-power liquid crystal display devices have been demanded. Liquid crystal display devices capable of displaying images in both reflective and transmissive modes (hereinafter, referred to as semi-transmissive liquid crystal display devices) have been used.

Further, in order to increase convenience, studies have been started to display a call status, an internet searching status and information searched, exchanged electronic mails, pictures taken by a camera, and the like on a full-color main screen, while auxiliary information including time, a battery status, news flash, and urgent information is always displayed on an auxiliary screen, a part of the main screen. However, since this auxiliary screen has to make the auxiliary information always viewable, there is a problem in that this type is more power-consuming than those without the auxiliary screens.

In order to solve this problem, there is known a method for displaying an image in a reflective mode in an auxiliary screen as disclosed in, for example, Japanese Patent Laid-Open Publication No. 2002-303863. However, with this method, front light is required in addition to outside light to secure sufficient brightness in the environments of everyday life. As the result, the power consumption increases.

In order to attain sufficient brightness without using front light, it is considered to remove a color filter from an auxiliary screen, as the color filter attenuates a third of brightness. In this case, the auxiliary screen becomes monochromatic and it thus mainly displays text information.

With this construction, monochromatic display by the auxiliary screen does not require front light but can still secure sufficient brightness in the everyday life environments, realizing adequate display quality for practical use.

However, a liquid crystal layer is generally an unaxial optical anisotropic substance where liquid crystal molecules in long axis direction and short axis direction have different refractive indexes, the wavelengths of light passing through the liquid crystal layer are dispersed. For this reason, the design of a liquid crystal display device with mere removal of a color filter has a problem in that white color display on an auxiliary is yellowed, resulting in notable degradation of display quality.

SUMMARY OF THE INVENTION

An object of the present invention is prevent a liquid crystal display device provided with a reflective-type monochromatic display screen in addition to a color display screen from having image quality degradation along with yellowing of the monochromatic display screen caused by wavelength dispersion characteristics of liquid crystal.

A liquid crystal display device according to the first aspect of the present invention comprises an array substrate and an opposed substrate placed to face each other, a liquid crystal layer held between the array substrate and the opposed substrate, a plurality of pixel electrodes arrayed on a surface of the array substrate on a side facing the opposed substrate, a color display region where a color layer is formed in each of the pixel electrodes, a monochrome display region where each of the pixel electrodes is a reflective electrode, and purple or blue color layers partially formed in each area corresponding to each of the reflective electrodes in the monochrome display region.

According to the present invention, the purple or blue color layer is formed a part of the area corresponding to each pixel electrode in the monochrome display region. Accordingly, light dispersed due to wavelength dispersion characteristics of a liquid crystal layer is absorbed by the color layer, it becomes possible to prevent image quality degradation resulted from yellowing of a display screen due to the wavelength dispersion characteristics of the liquid crystal layer.

Moreover, in the above-mentioned liquid crystal display device, the purple or blue color layer occupies 10% to 50% of the area of each pixel electrode.

In this aspect of the present invention, where the purple or blue color layer occupies less than 10% of the area of each pixel electrode, the suppressive effect on yellowing of a display screen is low because of a small area ratio of the color layer. Meanwhile, where the color layer occupies more than 50% of the area, brightness of a display screen is attenuated due to a large area ratio of the color layer. Hence, the area of the purple or blue color layer is within the abovementioned range so that dispersed light is adequately absorbed by the color layer. Further, with the above range, dispersed light is absorbed by the color layer even where various kinds of liquid crystal layers are used.

A liquid crystal display device of the second aspect of the present invention comprises an array substrate and an opposed substrate place to face each other, a liquid crystal layer held between the array substrate and the opposed substrate, a plurality of pixel electrodes arrayed on a surface of the array substrate on a side facing the opposed substrate, a color display region where a color layer is formed in each of the pixel electrodes and a transparent first overcoating layer is formed to cover the color layer, and a monochrome display region where each of the pixel electrodes is a reflective electrode, the transparent first overcoating layer is formed in each of the reflective electrodes, and a second overcoating layer colored in purple or blue is formed to cover the first overcoating layer.

According to the present invention, the second overcoating layer in purple or blue color is formed to cover the transparent first overcoating layer in the monochrome display region. Therefore, dispersed light due to wavelength dispersion characteristics of a liquid crystal layer is absorbed by the second overcoating layer.

In the above-mentioned liquid crystal display device, it is preferred that the chromaticity of purple color is set so that the hue angle h thereof defined by the chromaticity a* and b* of the L*a*b* color specification system be no less than 270 degrees nor no more than 360 degrees. The L*a*b* color specification system is a method of numerically describing colors of physical objects and defined by Commission Internationale de l'Eclairage (CIE).

BRIEF DESCRIPTION OF THE DRAWINGS

FIG. 13 is a graph showing spectrum of the auxiliary screen.

DESCRIPTION OF THE EMBODIMENTS

First Embodiment

Figure 1:
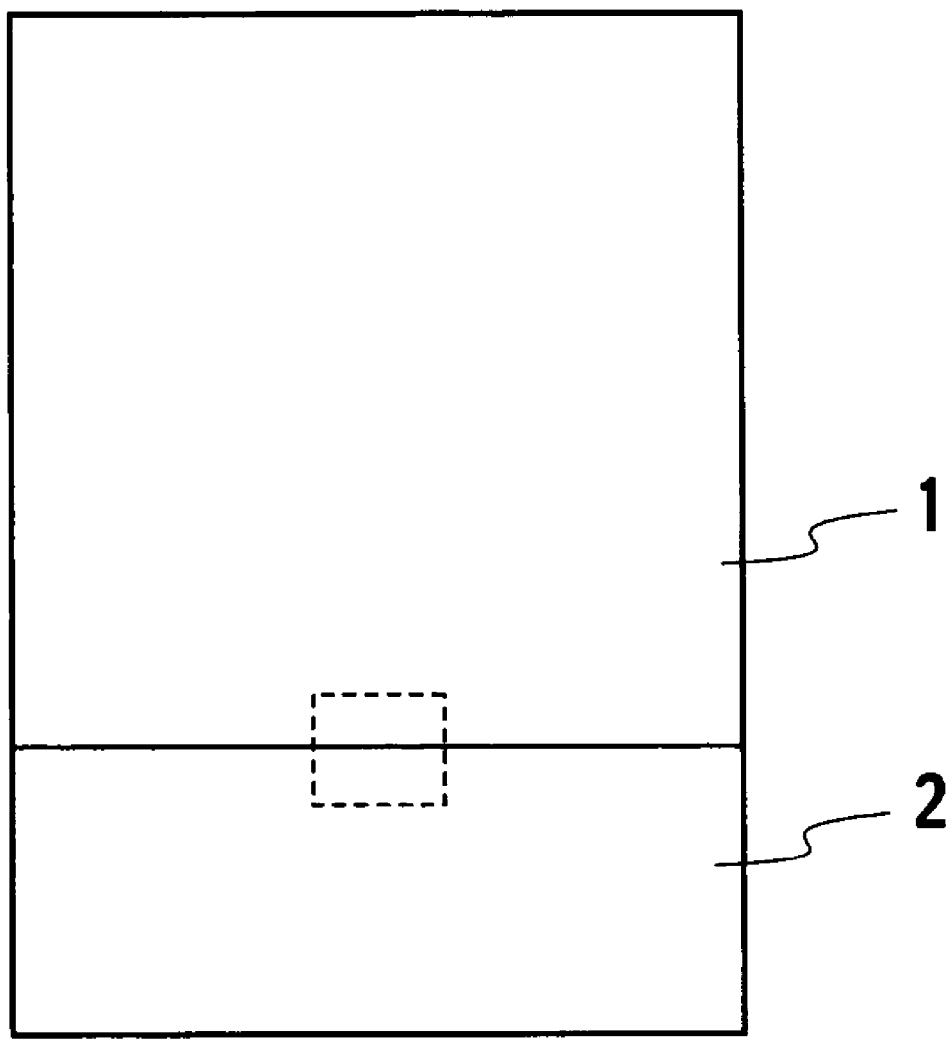
FIG. 1 is a plan view showing a schematic construction of a display screen of a liquid crystal display device according to the first embodiment.

As shown in the plan view in FIG. 1, a display screen of a liquid crystal display device of the first embodiment includes, for example, a main screen 1 for full-color display and an auxiliary screen 2 for monochrome display.

Figure 2:
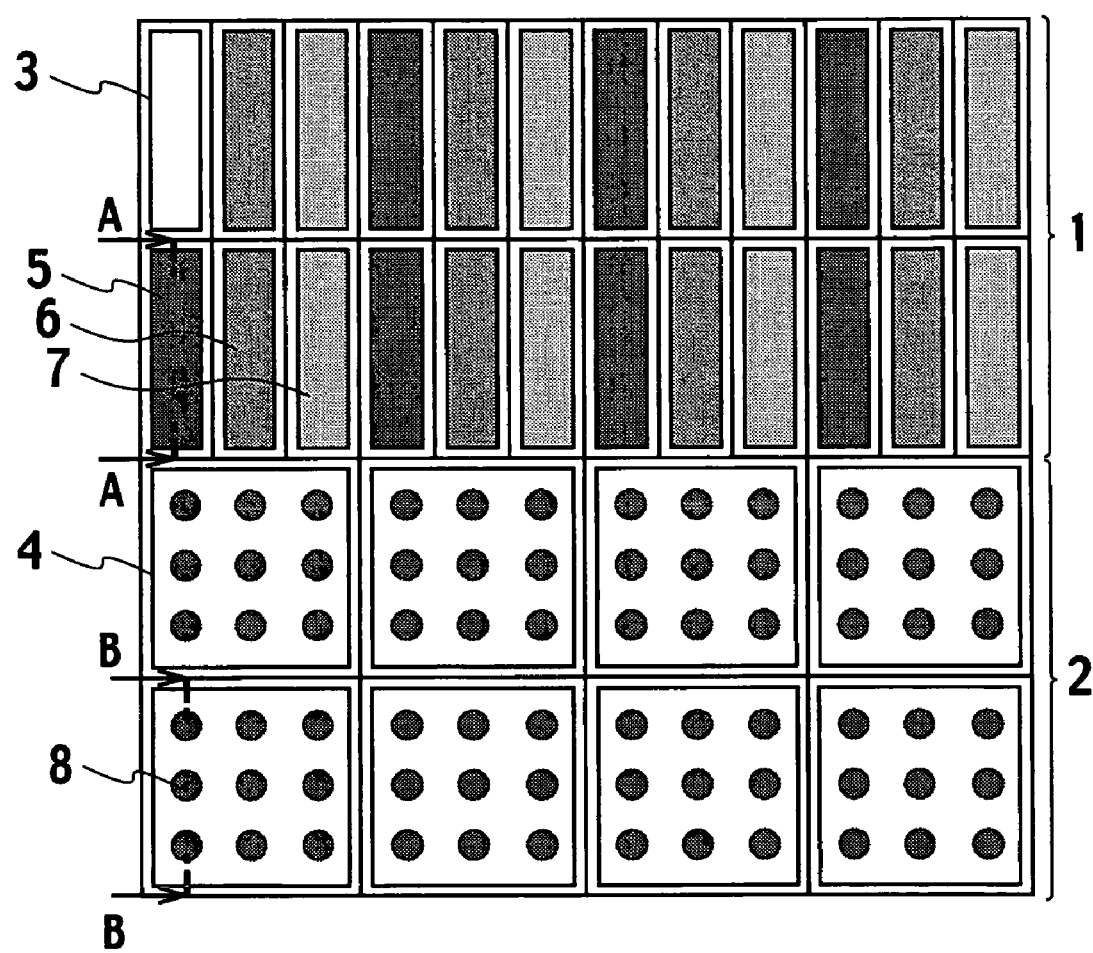
FIG. 2 is an enlarged plan view showing a construction of a border between a main screen and an auxiliary screen in an area surrounded by a box in a broken line in FIG. 1.

As shown in the enlarged plan view of FIG. 2, a plurality of pixel electrodes 3 are arrayed in the main screen 1 in matrix and a plurality of pixel electrodes 4 are arrayed in matrix the auxiliary screen 2. In the main screen 1, a blue color layer 5, a red color layer 6 and a green color layer 7 are also formed in the corresponding pixel electrodes 3, respectively. In the auxiliary screen 2, blue color layers 8 are partially formed in a dot pattern in a region corresponding to each of the reflective electrode 4. The left top pixel in FIG. 2 shows a pixel electrode 3 without a color layer for the sake of explanatory convenience.

The main screen 1 is, for example, a 2.2-inch QVGA display and has 240 pixels in the vertical direction and 320×3 pixels in the horizontal direction in this drawing, arrayed in a matrix. The auxiliary screen 2 has 24 pixels in the vertical direction and 320 pixels in the horizontal direction in the drawing, arrayed in a matrix. A pixel pitch in the main screen 1 is 150 μm×50 μm, the same in the auxiliary screen is 150 μm×150 μm.

Next, specific constructions of the main screen 1 and the auxiliary screen 2 are described with reference to FIGS. 3 and 4.

Figure 3:
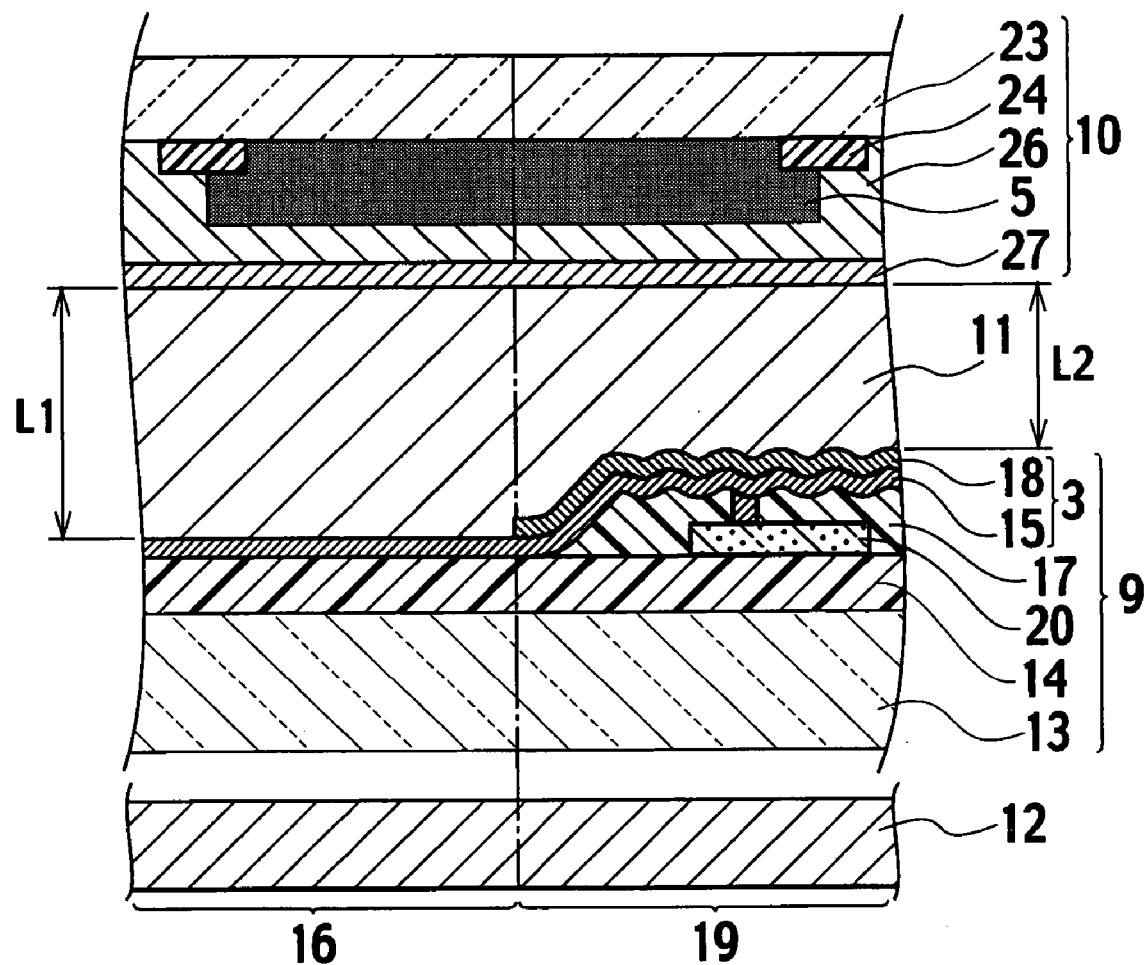
FIG. 3 is a cross-sectional view of one pixel of a main screen, taken along the line A-A in FIG. 2.

The main screen 1 is, for example, a semi-transmissive type image display and each pixel is provided with a transmissive display region 16 and a reflective display region 19 as shown in FIG. 3. A liquid crystal layer 11 is held between an array substrate 9 and an opposed substrate 10. A surface light source device 12 is placed on the array substrate 19 on a side opposite to the liquid crystal layer 11.

In the array substrate 9 within the transmissive display region 16, a transparent electrode 15, serving as a pixel electrode, is formed on an optically transparent glass substrate 13 through an insulating layer 14. In the reflective display region 19, a reflective electrode 18, serving as a pixel electrode, is formed on the insulating layer 14 through a concavo-convex insulating layer 17. The reflective electrode 18 is electrically connected to a thin-film transistor 20 through a contact hole provided in the insulating layer 17. Here, the reflective electrode 18 is, for example, a conductive reflective film made of Al or the like, and the transparent electrode 15 is, for example, a transparent conductive film made of indium tin oxide or the like. Cell gaps in the transmissive display region 16 and the reflective display region 19 are different by a thickness of the insulating layer 17. For instance, the cell gap L1 in the transmissive display region 16 and the sane L2 in the reflective display region 19 are 5 μm and 3.0 μm, respectively.

In the opposed substrate 10, resin-made shielding films 24 for obscuring outside light are formed on the bottom surface of the glass substrate 23. Between the shielding films 24, the blue color layer 5, the red color layer 6 or the green color layer 7 is formed in the corresponding pixel electrodes. FIG. 3 shows an example of a pixel where the blue color layer 5 is formed. Further, under the glass substrate 23 with the blue color layer 5 and the shielding films 24 formed on the bottom surface thereof, a transparent overcoating layer 26 is formed for giving durability and smoothing the surface. A transparent electrode 27 is further placed on the bottom surface of the overcoating layer 26.

Alignment films are formed on the top surfaces of the transparent electrode 15 and the reflective electrode 18 in the array substrate 9 and on the bottom surface of the transparent electrode 17, respectively. By forming these alignment films, the liquid crystal layer 11 is formed so that liquid crystal molecules are aligned in approximately the same direction without voltage applied. Here, as an example, homogeneous mode liquid crystal is used. With this mode of liquid crystal, longer axes of liquid crystal molecules within a liquid crystal layer are initially arrayed in parallel with the top and bottom substrates. The alignment films are subject to a rubbing process so that liquid crystal molecules are arrayed at pretilt angle of 6 degrees.

Figure 4:
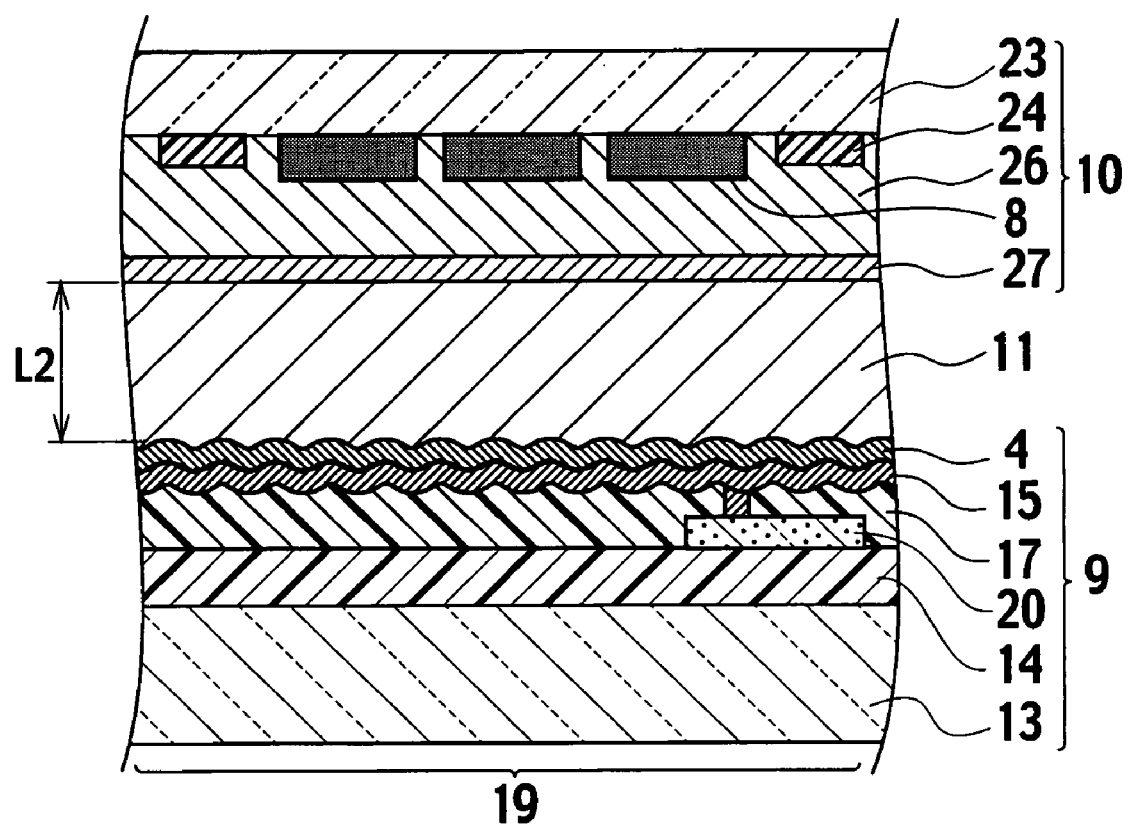
FIG. 4 is a cross-sectional view of one pixel of an auxiliary screen, taken along the line B-B in FIG. 2.

The auxiliary screen 2 is a reflective type image display and each pixel has a reflective display region 19 as shown in FIG. 4.

Within an array substrate 9 of the auxiliary screen 2, an insulating layer 14 is formed on an optical transparent glass substrate 13. Further, a reflective electrode 4, serving as a pixel electrode, is formed on the insulating layer 14 through a concavo-convex insulating layer 17. The reflective electrode 4 is electrically connected to a thin-film transistor 20 through a contact hole provided in an insulating layer 17. Within an opposed substrate 10, shielding films 24 for obscuring outside light are formed on the bottom surface of a 0.7 mm-thick glass substrate 23. Furthermore, blue color layers 8 are partly formed in the area between the shielding films 24.

Here, the plurality of blue color layers 8 are randomly formed in a dot pattern with a dot diameter of 30 µm relative to a pixel pitch of 150 µm, occupying 30% of the area of each reflective electrode 4 in the auxiliary screen. Since these dots are too small to be visible to the naked eye, there is no problematic effect on the display quality. Moreover, by forming the blue color layers 8 in the same processes for the blue color layers 5, the red color layers 6 and the green color layers 7, manufacturing costs and time can be maintained at almost the same level as the conventional levels.

Moreover, under the glass substrate 23 with the blue color layers 8 and the shielding films 24 formed on the bottom surface thereof, a transparent overcoating layer 26 for improving durability and smoothing the surface is formed. Further, a transparent electrode 27 is placed under the overcoating layer 16. Note that, in FIG. 4, the same parts or members as those in FIG. 3 are indicated by the same reference numerals and thereby omit duplicated explanation.

Next, effects of the auxiliary screen in which the blue color layers are partially formed are described with reference to graphs shown in FIGS. 5 and 6.

Figure 5:
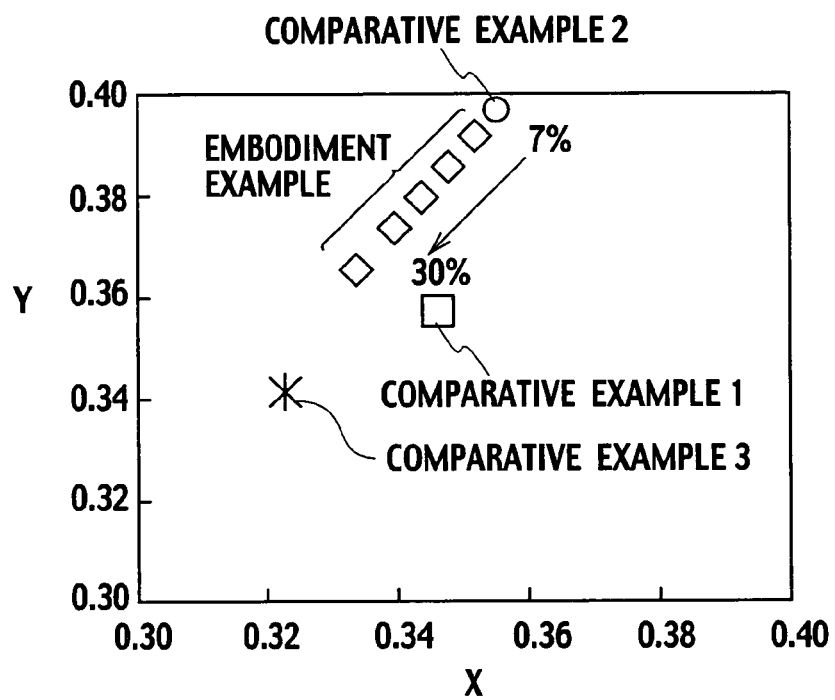
FIG. 5 is a graph showing white levels on the auxiliary screen.

FIG. 5 is a graph showing a white level of the auxiliary screen, and the vertical and horizontal axes of the graph represent a chromaticity coordinate. The chromaticity shown in this graph is expressed using the XYZ color specification system defined by the Commission Internationale de l'Eclairage (CIE). The embodiment example in the graph represents chromaticity in a case where the blue color layers are partially formed in an area corresponding to each pixel electrode of the auxiliary screen. "7%→30%" represents changes of an area ratio of the blue color layers relative to each pixel region. The comparative example 1 in this graph represents chromaticity in a case where a blue color filter is provided over the entire surface of an area corresponding to each pixel region. The comparative example 2 represents chromaticity of the auxiliary screen where the color filter is removed from the reflective display. The comparative example 3 represents chromaticity of a white-light source.

With a conventional design of a color liquid crystal display device, yellowing of a display screen occurs due to wavelength dispersion characteristics of liquid crystal. However, in the case of comparative example 1, the level of yellowing of the display screen is not so bad so as to be considered a defect because brightness is attenuated by the color filter. On the other hand, in the case of comparative example 2 where the color filter is removed, the value of chromaticity is higher than those of comparative examples 1 and 3, indicating that the level of yellowing of the auxiliary screen in comparative example 2 is higher.

As the area of the blue color layers is increased as shown in the embodiment example, the white level value of the auxiliary screen moves closer to the chromaticity value of the white-light source in comparative example 3. This means that white color display on the auxiliary screen changes towards an ideal white color of the white-light source. In particular, where an area of the blue color layers occupies about 30% of each pixel region, the white level of the auxiliary screen is approximately the same as that of comparative example 1 with the color filter. In other words, by providing the blue color layers which occupy around 30% of each pixel region, yellowing of reflective display on the auxiliary screen can be adequately suppressed.

Figure 6:
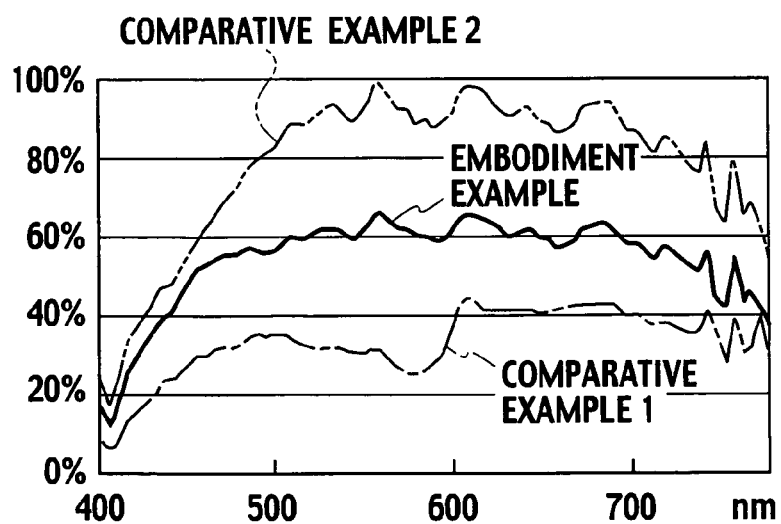
FIG. 6 is a graph showing spectrum of the auxiliary screen.

FIG. 6 is a graph showing spectrums of the auxiliary screen. In this graph, the vertical axis represents spectrum and the horizontal axis represents a range of light wavelengths. In this graph, embodiment example indicates a spectrum in a case where the blue color layers formed occupies 30% of each pixel region, comparative example 1 indicates a spectrum in a case where a blue filter is provided, and comparative example 2 indicates a spectrum in a case where the color filter is removed.

This graph quantitatively shows that auxiliary screen has a high level of brightness in comparative example 2 where the color filter is removed in comparison with the case of comparative example 1 where the color filter is provided. The graph also shows that sufficient brightness can be secured in the embodiment example.

According to the first embodiment, the auxiliary screen is designed to be monochromatic by removing a color filter in order to secure brightness, and, at the same time, the blue color layers are partially formed in an area corresponding to each reflective electrode of the auxiliary screen. Therefore, light dispersed due to wavelength dispersion characteristics of liquid crystal is absorbed by the blue color layers, suppressing yellowing of the display screen caused by light dispersion. This blue color layer's suppressive effect on yellowing of the display screen works independently from an optical performance of full-color display. Hence, sufficient brightness can be secured without fluctuating properties of full-color display on the main screen.

Note that, in this embodiment, the liquid crystal display device using homogeneous mode liquid crystal was explained as an example, and the blue color layers are formed in an area of 30% of each reflective electrode in the auxiliary screen. However, the present invention is not limited to this. The present invention can be applied to all liquid crystal display devices using different kinds of liquid crystal such as twisted nematic mode liquid crystal or super twisted nematic liquid mode crystal.

In these cases, an extent of yellowing of a display screen varies depending on a liquid crystal mode. Therefore, an area of the blue color layers needs to be determined based upon a liquid crystal mode. Where the blue color layers are formed in an area occupying less than 10% of each pixel electrode, the suppressive effect on yellowing of a display screen is low because of a small area ratio of the blue color layers. Meanwhile, where the blue color layers occupy an area more than 50% of each pixel electrode, brightness is attenuated by the blue color layers. Therefore, it is preferred that the area of the blue color layers in each pixel electrode be within a range from 10% to 50%. In this case, light dispersed due to wavelength dispersion characteristics of the liquid crystal layer is also absorbed by the blue color layers, thus suppressing degradation of the auxiliary screen's image display caused by yellowing thereof.

According to this embodiment, the blue color layers are formed in a dot pattern in an area corresponding to each reflective electrode in the auxiliary screen 2. However, the pattern of the blue color layers is not limited to the dot pattern and may be a different pattern.

Figure 7:
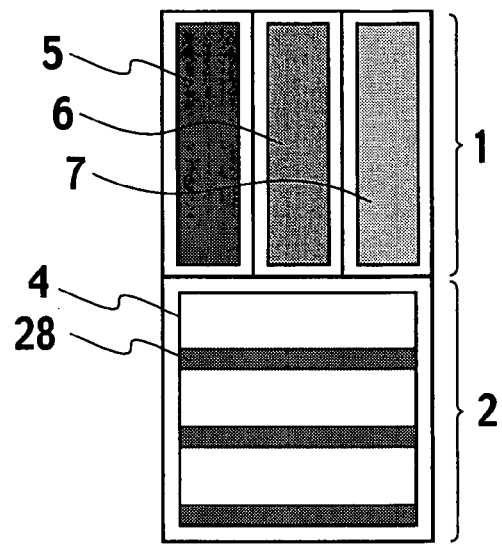
FIG. 7 is a plan view showing a second example of a blue color layer pattern.

FIG. 7 shows the second example of a pattern of blue color layers. This drawing depicts blue color layers 28 formed in a stripe in an area corresponding to each reflective electrode 4 of the auxiliary screen 2. In this case, intervals between the blue color layers within each pixel are equal. Therefore, dispersed light is evenly absorbed in the color layers within each pixel, suppressing yellowing of the auxiliary screen effectively.

Figure 8:
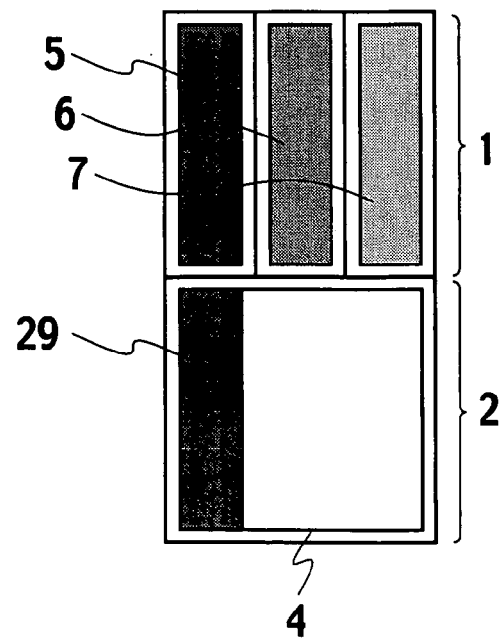
FIG. 8 is a plan view showing a third example of a blue color layer pattern.

FIG. 8 shows the third example of a pattern of blue color layers. This drawing depicts a blue color layer 29 formed in the same shape as the blue color layer 5 in the main screen 1 so that the blue color layer 29 occupies a third of the area of the reflective electrode 4 of the auxiliary screen. In this case, the blue color layer 29 can be formed in exactly the same process as the color layers of the main screen, and thereby yellowing of the auxiliary screen can be suppressed with no increase in manufacturing costs.

In this embodiment, the main screen for color display is a semi-transmissive-type image display screen as each pixel electrode thereof is made up of a reflective electrode and a transmissive electrode. However, the type of the main screen is not limited to this. For example, the main screen may be a reflective-type image display screen which has only reflective electrodes as its pixel electrodes. Alternatively, the main screen may be a transmissive-type image display screen which only has transmissive electrodes as its pixel electrodes. In these cases, the yellowing suppressive effect of the blue color layers of the auxiliary screen also acts independently from an optical performance of full-color display, thus securing sufficient brightness without fluctuating characteristics of full-color display on the main screen.

In this embodiment, a liquid crystal display device using homogeneous mode liquid crystal is explained as an example and only blue color layers are partially formed in an area corresponding to each pixel electrode in the auxiliary screen. However, the present invention is not limited to this. For example, purple color layers, or mixed blue and purple color layers may be formed instead of blue color layers. It is also possible use a mixture of other color layers such as red or green color layers.

Second Embodiment

Similarly to the plan view of the display screen in FIG. 1 of the first embodiment, a display screen of a liquid crystal display device of the second embodiment includes a main screen 1 for color display and an auxiliary screen 2 for monochrome display.

Figure 9:
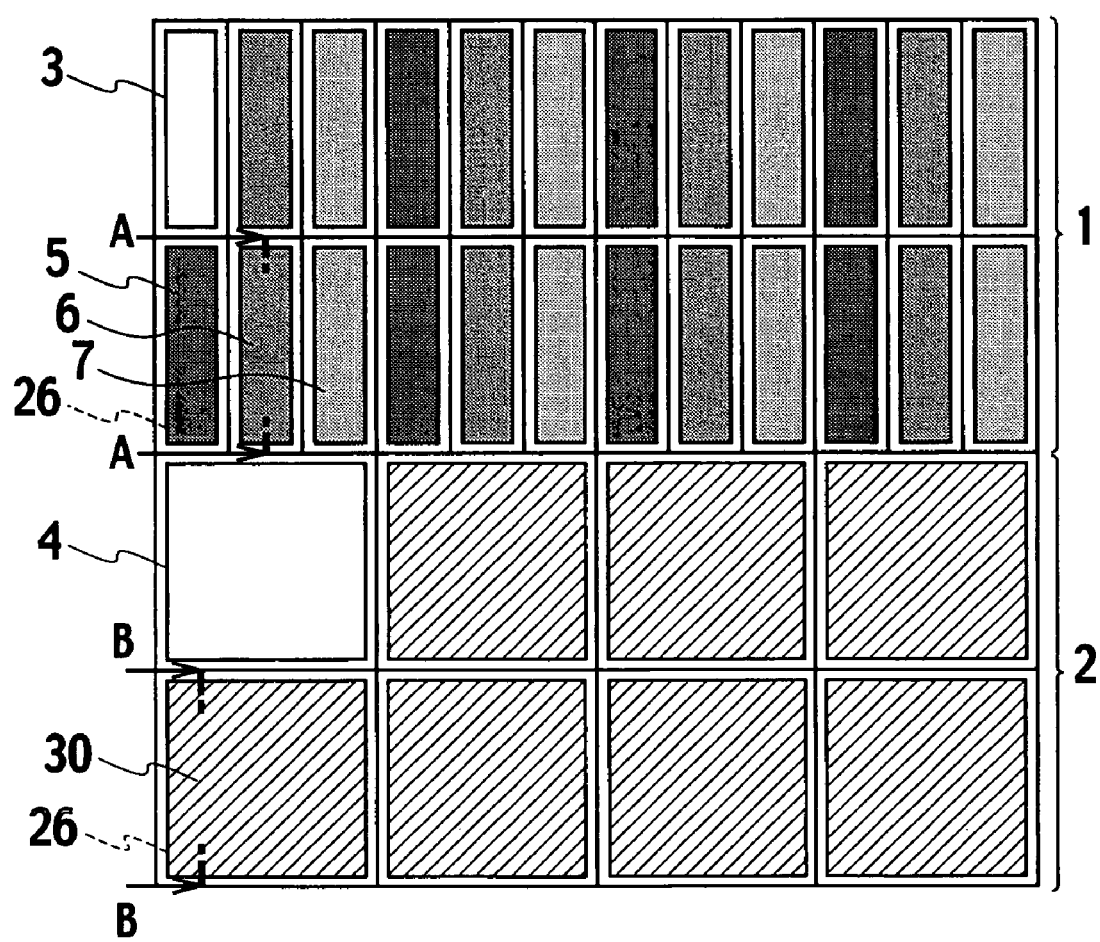
FIG. 9 is an enlarged plan view showing a construction of a border between a main screen and an auxiliary screen on a display screen of a liquid crystal display device according to a second embodiment.

As shown in an enlarged plan view of FIG. 9, a plurality of pixel electrodes 3 is arrayed in matrix in the main screen 1 and a plurality of reflective electrodes 4, serving as pixel electrodes is arrayed in matrix in the auxiliary screen 2.

In the main screen 1, a blue color layer 5, a red color layer 6, and a green color layer 7 are formed in the corresponding pixel electrode 3, and a transparent first overcoating layer 26 is formed to cover the above-mentioned color layers. In FIG. 9, the color layer and the first overcoating layer 26 are removed from the top left pixel for the sake of explanatory convenience.

In the auxiliary screen 2, a second overcoating layer 30 in a purple color is formed to cover the transparent first overcoating layer 26 which is formed on each reflective electrode 4. In FIG. 9, the first overcoating layer 26 and the colored second overcoating layer 30 are removed from the top left pixel for the sake of explanatory convenience.

In the second embodiment, the main screen 1 is again a 2.2-inch QVGA display and has 240 pixels in the vertical direction and 320×3 pixels in the horizontal direction in this drawing, arrayed in a matrix. The auxiliary screen 2 has 24 pixels in the vertical direction and 320 pixels in the horizontal direction in the drawing, arrayed in a matrix. A pixel pitch in the main screen 1 is 150 µm×50 µm, the same in the auxiliary screen is 150 µm×150 µm.

Next, specific constructions of the main screen 1 and the auxiliary screen 2 of this embodiment are described with reference to cross sectional views in FIGS. 10 and 11.

Figure 10:
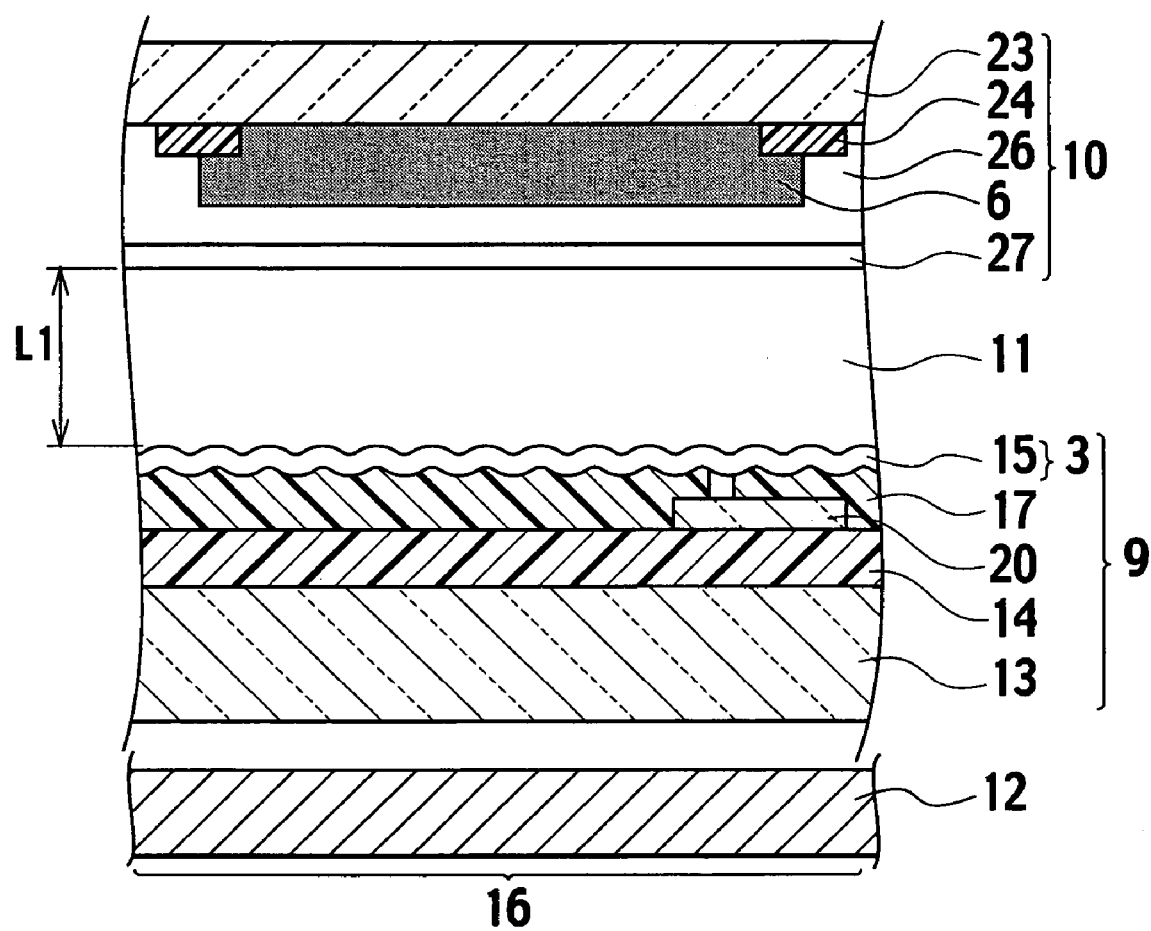
FIG. 10 is a cross-sectional view of one pixel of the main screen, taken along the line A-A in FIG. 9.

The main screen 1 is, for example, a transmissive-type image display screen and each pixel is provided with a transmissive display region 16 as shown in FIG. 10. A liquid crystal layer 11 is held between an array substrate 9 and an opposed substrate 10. A surface light source device 12 is placed on the array substrate 9 on the opposite side of the liquid crystal layer 11.

Within the array substrate 9, a transparent electrode 15, serving as the pixel electrode 3, is formed on an optically transparent glass substrate 13 through an insulating layer 14. The transparent electrode 15 is electrically connected to a thin-film transistor 20 through a contact hole provided in an insulating layer 17. Here, as the transparent electrode 15, the transparent conductive film made of indium tin oxide or the like is used.

In the opposed substrate 10, resin-made shielding films 24 for obstructing outside light are formed on the bottom surface of a 0.7 mm-thick glass substrate 23. In order to realize full-color display, the blue color layer 5, the red color layer 6, or the green color layer 7 is formed in each pixel electrode. FIG. 10 shows an example of a pixel where the red color layer 6 is formed. A transparent first overcoating layer 26 for improving durability and smoothing the surface is formed under the glass substrate 23 with the red color layer 23 and the shielding films 24 formed on the bottom surface thereof. Further, a transparent electrode 27 is placed on the bottom surface of the first overcoating layer 26.

Alignment films are formed on the top surface of the transparent electrode 15 in the array substrate 9 and on the bottom surface of the transparent electrode 27 in the opposed substrate 10, respectively. By forming these alignment films, the liquid crystal layer 11 is formed so that liquid crystal molecules are aligned in approximately the same direction without voltage applied. Here, as an example, homogeneous mode liquid crystal is used. In this mode of liquid crystal, longer axes of liquid crystal molecules within a liquid crystal layer are initially arrayed in parallel with the top and bottom substrates. The alignment films are subject to a rubbing process so that liquid crystal molecules are arrayed at pretilt angle of 6 degrees. A cell gap L1 in the transmissive display region is, for example, 5 µm.

Figure 11:
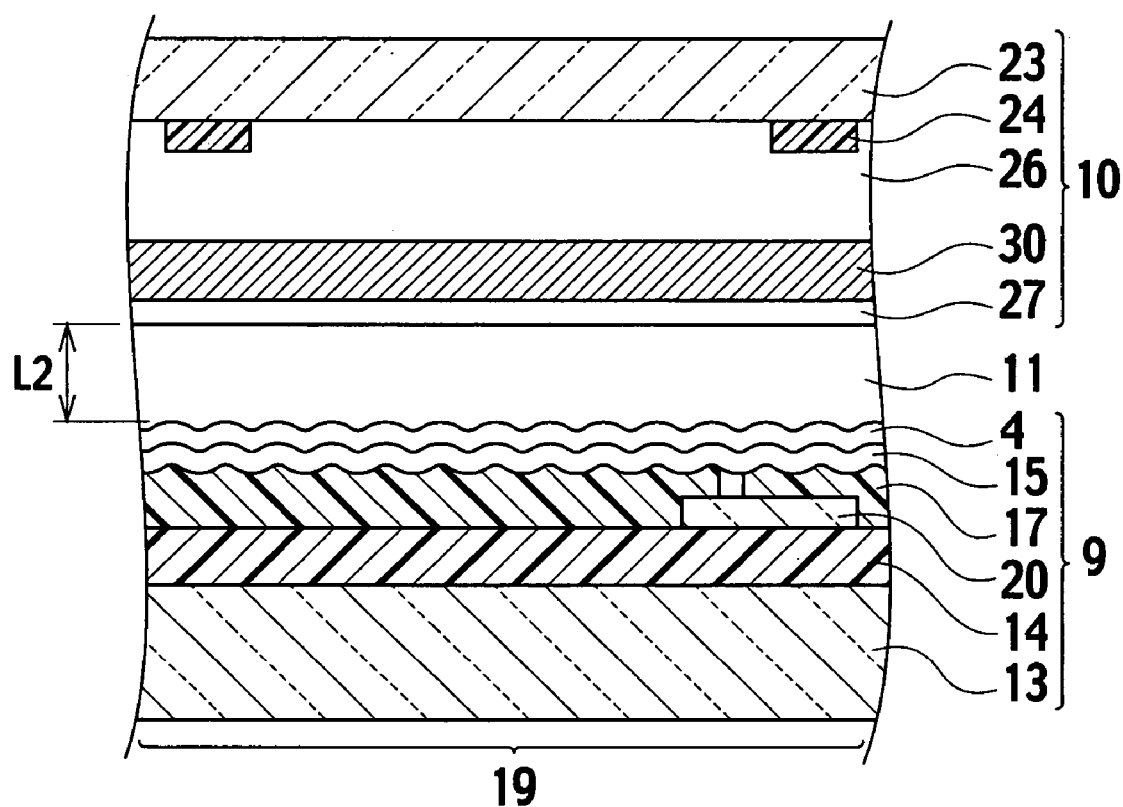
FIG. 11 is a cross-sectional view of one pixel of the auxiliary screen, taken along the line B-B in FIG. 9.

The auxiliary screen 2 is a reflective-type image display screen and each pixel thereof is provided with a reflective display region 19 as shown in FIG. 11. Note that members and parts same as those in FIG. 10 are indicted by the same reference numerals and thus omit duplicated description.

In an array substrate 9, an insulating layer 14 is formed on an optically transparent glass substrate 13. Further, on the top of the insulating layer 14, a reflective electrode 4, serving as a pixel electrode 3, is formed through a concavo-convex insulating layer 17. The reflective electrode 4 is electrically connected to a thin-film transistor 20 through a contact hall provided in the insulating layer 17. For the reflective electrode 4, for example, a conductive reflective film made of Al or the like is used.

In an opposed substrate 10, resin-made shielding films 24 for obstructing outside light are formed on the bottom surface of a 0.7 mm-thick glass substrate 23. A transparent first overcoating layer 26 for improving durability and smoothing the surface is formed under the glass substrate 23 with the shielding films 12 formed on the bottom surface thereof. Furthermore, a second overcoating layer 30 in purple color is formed so as to cover the first overcoating layer 26. A cell gap L2 in the reflective display region 19 is, for example, 2.5 μm.

Depth of purple color of the second overcoating layer 30 is so low to be visually unidentifiable, and thus the color does not influence display quality. Moreover, since the second overcoating layer 30 is an essential member to form the cell gap L2 for reflective display in a manufacturing process of the reflective display region 19, there is no increase in manufacturing process.

Next, an effect of the auxiliary screen provided with the purple-colored second overcoating layer 30 is described with reference to graphs shown in FIGS. 12 and 13.

Figure 12:
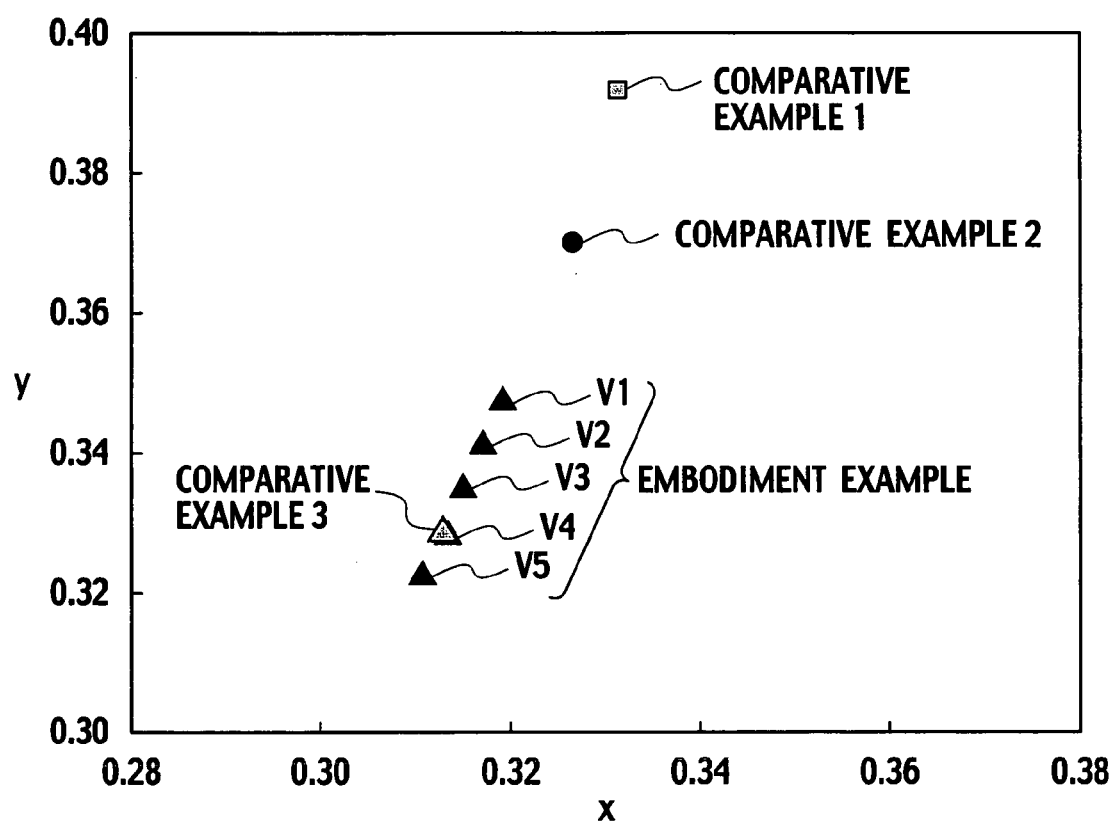
FIG. 12 is a graph showing white levels on the auxiliary screen.

FIG. 12 shows a graph indicating chromaticity of the auxiliary screen, and the vertical and horizontal axes of the graph represent a chromaticity coordinate. The chromaticities shown in this graph are expressed by the XYZ color specification system specified by the CIE. Embodiment example v1, v2, v3, v4 and v5 represent chromaticities measured on a scale of 1 to 5 of the depth of purple color of the second overcoating layer formed in each pixel electrode of the auxiliary screen. Comparative example 1 in the graph represents chromaticity when a red color filter is provided. Comparative example 2 represents chromaticity when the color filter is removed. Comparative example 3 represents chromaticity of a white light source. Here, D65 defined by Japanese Industrial Standards and having similar conditions as natural light is used as the white light source.

This graph shows that, a chromaticity value of the auxiliary screen in comparative example 2 without the color filter is higher than that of the white light source of comparative example 3. This is because, in comparative example 2, the display screen is yellowed due to wavelength dispersion characteristics of liquid crystal. On the other hand, chromaticities (v1 to v5) of the depth of purple color in five scales in embodiment example are closer to the chromaticity of the white light source of comparative example 3. Here, the chromaticity v4 is almost equal to the chromaticity value of the white light source of comparative example 3.

This means that, by coloring the second overcoating layer 30 into purple, white color display on the auxiliary screen approximates to an ideal white color of the white light source, and yellowing of reflective display is thus suppressed. The graph also shows that the suppressive effect on yellowing is particularly high at the chromaticity obtained when the depth of purple color is around v4.

FIG. 13 is a graph showing a spectrum of the auxiliary screen. The vertical axis of this graph represents a spectrum and the horizontal axis of same represents ranges of light wavelengths. Embodiment example in the graph indicates a spectrum in a case where the purple-colored second overcoating layer is used, and comparative example 2 indicates a spectrum in a case where a color filter is removed.

This graph quantitatively shows that a level of brightness is higher in the case of comparative example 2 where the color filter is removed, in comparison with comparative example 1 where the color filter is provided. The graph also shows that sufficient brightness can be secured in embodiment example.

In the second embodiment, a color filter is removed from the auxiliary screen for monochrome display in order to secure brightness, and, at the same time, the purple-colored second overcoating layer 30 is formed in each reflective electrode in the auxiliary screen. Hence, light dispersed due to wavelength dispersion characteristics of the liquid crystal layer is absorbed by the second overcoating layer 30, suppressing yellowing of a display screen caused dispersed light. The yellowing suppressive effect of the second overcoating layer 30 acts independently from an optical performance of full-color display. Therefore, sufficient brightness is secured without fluctuating characteristics of full-color display of the main screen 1.

In this embodiment, the depth of purple color of the second overcoating layer 30 is expressed by chromaticity in the XYZ color specification system defined by CIE. However, the expression of the color depth is not limited to this. The depth of purple color can be expressed by chromaticity a* and b* values of the L*a*b* color specification system defined by CIE. In this case, it is preferred that the depth of purple color of the second overcoating layer expressed by a hue angle h defined by chromaticity a* and b* values, be within a range from 270 degrees and 360 degrees under a measuring condition where D65 is used as the white light source. The equation to obtain the hue angle h is as follows:

$$h=\tan^{-1}(b^*/a^*) \qquad (1)$$

Accordingly, light dispersed due to wavelength dispersion characteristics of the liquid crystal layer is absorbed by the purple-colored second overcoating layer, and thereby yellowing of a display screen caused by dispersed light is suppressed.

In this embodiment, the liquid crystal display device uses homogeneous mode liquid crystal but liquid crystal used in the device is not limited thereto. The purple overcoating layer can be applied not only to a monochrome display screen using homogeneous liquid crystal, but also to those using twisted nematic mode liquid crystal or super twisted nematic mode liquid crystal where liquid crystal molecules are twisted between top and bottom substrates.

In this case, a level of yellowing of a display screen varies depending on a type of liquid crystal mode. Therefore, depth of purple color should be changed for each liquid crystal mode.

According to this embodiment, the second overcoating layer formed in each reflective electrode of the auxiliary screen is colored in purple. However, the color of the second overcoating layer is not limited to purple. As long as the second overcoating layer has a color capable of absorbing light dispersed due to wavelength dispersion characteristic of the liquid crystal layer, yellowing of a display screen due to dispersed light can be suppressed. For example, an overcoating layer colored in blue can be used.

In this embodiment, the main screen is a transmissive-type image display screen as transmissive electrodes are formed as its pixel electrodes. However, the type of the main screen is not limited to this. For example, in the main screen shown in FIG. 10, a reflective electrode may be made partly in each pixel and a transparent second overcoating layer may be further formed on the first overcoating layer 26 so that the main screen has a multigap structure having the cell gap L2 for the reflective display region as well as the cell gap L1 for the transparent display region. Thus, the main screen becomes a semi-transmissive-type display screen which can display images by both transmissive and reflective display modes. In this case, it is preferred that the cell gap L2 is set at a half length of the cell gap L1 under consideration of a difference between paths of reflected light and transmitted light. In such a case, yellowing suppressive effect of the blue color layers of the auxiliary screen for monochromatic display also acts independently from an optical performance of the full-color display. Therefore, sufficient brightness can be secured without fluctuating full-color display of the main screen.

In this embodiment, the second overcoating layer of the auxiliary screen is formed in each reflective electrode. However, an area where the second overcoating layer is formed is not limited thereto. For example, the second overcoating layer may be formed to cover the entire auxiliary screen.

What is claimed is:

1. A liquid crystal display device, comprising:
   an array substrate and an opposed substrate place to face each other;
   a liquid crystal layer held between the array substrate and the opposed substrate;
   a plurality of pixel electrodes arrayed on a surface of the array substrate on a side facing the opposed substrate;
   a color display region where a color layer is formed on each of the pixel electrodes and a transparent first overcoating layer is formed to cover the color layer; and
   a monochrome display region where each of the pixel electrodes is reflective, the first overcoating layer is formed on each of the reflective electrodes, and a second overcoating layer colored in purple or blue is formed to cover the first overcoating layer.

2. The liquid crystal display device according to claim 1, wherein chromaticity of the purple or blue colors, expressed by a hue angle h defined using chromaticity a* and b* values in the L*a*b* color specification system, ranges from 270 degrees to 360 degrees.

* * * * *